United States Patent
Nguyen et al.

(10) Patent No.: US 10,845,859 B2
(45) Date of Patent: Nov. 24, 2020

(54) PARALLEL OUTPUT OF BACKUP POWER MODULES

(71) Applicant: HEWLETT PACKARD ENTERPRISE DEVELOPMENT LP, Houston, TX (US)

(72) Inventors: Hai Ngoc Nguyen, Houston, TX (US); Abhishek Banerjee, Houston, TX (US); Darrel G. Gaston, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 200 days.

(21) Appl. No.: 15/768,380

(22) PCT Filed: Oct. 29, 2015

(86) PCT No.: PCT/US2015/057955
§ 371 (c)(1),
(2) Date: Apr. 13, 2018

(87) PCT Pub. No.: WO2017/074375
PCT Pub. Date: May 4, 2017

(65) Prior Publication Data
US 2018/0299937 A1 Oct. 18, 2018

(51) Int. Cl.
*G06F 1/30* (2006.01)
*G06F 1/26* (2006.01)
(Continued)

(52) U.S. Cl.
CPC ............... *G06F 1/30* (2013.01); *G06F 1/263* (2013.01); *H02J 9/06* (2013.01); *H02J 9/061* (2013.01);
(Continued)

(58) Field of Classification Search
CPC ... G06F 1/26; G06F 1/263; G06F 1/30; G06F 1/3206; G06F 11/2015; H02J 9/06; H02J 9/061
(Continued)

(56) References Cited

U.S. PATENT DOCUMENTS 5,157,269 A 10/1992 Jordan et al.
5,939,801 A * 8/1999 Bouffard ................... H02J 1/10
307/18
(Continued)

FOREIGN PATENT DOCUMENTS

WO WO-2009020788 A1 2/2009

OTHER PUBLICATIONS

International Search Report and Written Opinion, International Application No. PCT/U52015/057955, dated Jul. 28, 2016, pp. 1-10, KIPO.
(Continued)

*Primary Examiner* — Ji H Bae
(74) *Attorney, Agent, or Firm* — Brooks, Cameron & Huebsch, PLLC

(57) ABSTRACT

In one example, a system for parallel output of backup power modules includes a first backup power module coupled to an input and a first output of an enclosure, a second backup power module coupled to the input and a second output of the enclosure, wherein the second backup power module is coupled in parallel with the first backup power module, and a switch coupling the first backup power module and the first output of the enclosure to the second output of the enclosure.

3 Claims, 2 Drawing Sheets

(51) Int. Cl.
*H02J 9/06* (2006.01)
*G06F 1/3206* (2019.01)
*G06F 11/20* (2006.01)

(52) U.S. Cl.
CPC .............. *G06F 1/26* (2013.01); *G06F 1/3206* (2013.01); *G06F 11/2015* (2013.01)

(58) Field of Classification Search
USPC .................................... 713/340, 300; 714/14
See application file for complete search history.

(56) References Cited

U.S. PATENT DOCUMENTS

| | | | |
|---|---|---|---|
| 6,041,414 | A | 3/2000 | Kikuchi |
| 8,400,012 | B2 | 3/2013 | Weidenheimer et al. |
| 8,829,714 | B2 | 9/2014 | Lai et al. |
| 8,873,258 | B2 | 10/2014 | Hiller et al. |
| 2001/0011845 | A1 | 8/2001 | Simonelli |
| 2006/0242435 | A1* | 10/2006 | Swope ...................... G06F 1/26 713/300 |
| 2013/0076132 | A1 | 3/2013 | Cohen et al. |
| 2013/0193761 | A1 | 8/2013 | Colombi et al. |
| 2015/0076915 | A1* | 3/2015 | Liang ...................... H02J 9/061 307/66 |
| 2015/0134980 | A1* | 5/2015 | Chen ...................... G06F 1/3206 713/300 |
| 2017/0033595 | A1* | 2/2017 | Mandarino ............. H02J 9/061 |
| 2018/0143263 | A1* | 5/2018 | Humphrey ............. G01R 31/40 |

OTHER PUBLICATIONS

Joseph M. Guerrero, "Control of Distributed Uninterruptible Power Supply Systems," IEEE Transactions on Industrial Electronics, Aug. 2008, pp. 2845-2859, vol. 55, No. 8, IEEE.

* cited by examiner

PARALLEL OUTPUT OF BACKUP POWER MODULES

BACKGROUND

Computing systems can utilize devices such as an uninterruptible power system (UPS). The UPS can help provide backup power to the computing system when main power fails. It can be important to utilize a UPS that can provide adequate power to a load when there is a failure of a main power source. Loads can be altered or exchanged for different types of loads and the altered or exchanged loads can utilize different quantities of power. In some cases, the altered loads can utilize more power than a UPS is capable of providing, which can place the altered load at risk for failure when backup power is utilized.

DETAILED DESCRIPTION

Figure 1:
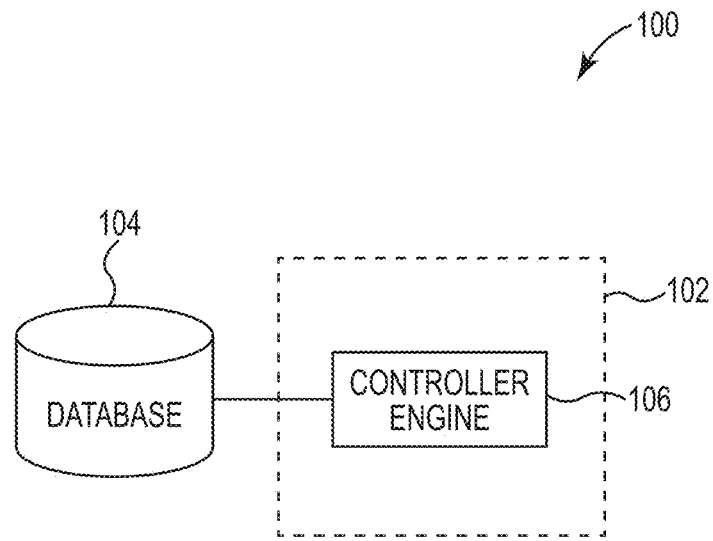
FIG. 1 illustrates a diagram of an example of a system for parallel output of backup power modules consistent with the present disclosure.

A number of methods, systems, and computer readable medium for parallel output of backup power modules are described herein. In one example, a system for parallel output of backup power modules can include a first backup power module coupled to an input and a first output of an enclosure, a second backup power module coupled to the input and a second output of the enclosure, wherein the second backup power module is coupled in parallel with the first backup power module, and a switch coupling the first backup power module and the first output of the enclosure to the second output of the enclosure.

In some examples, the system for parallel output of backup power modules can include a plurality of backup power modules that are coupled in parallel. In some examples, each of the plurality of backup power modules can be coupled to a corresponding load. In some examples, it can be important that a backup power module can provide adequate power to a load. For example, a first backup power module may be able to provide adequate power (e.g., power utilized by the load to function to a specification of the load, etc.) to a first load during normal operation (e.g., when the main power supply is functional, when the main power supply is activated, etc.). In this example, the first backup power module may also be able to provide adequate power to the first load during a backup process (e.g., when a main power supply is not functional, when a main power supply is deactivated, etc.). In some examples, the first load can be changed or altered to utilize a greater quantity of power. In these examples, a switch can be activated that allows the first backup power module and a second backup power module to combine resources to provide adequate power to the first load.

In some examples, the switch can couple an output of a first backup power module to an output of a second backup power module to provide power to a load that is coupled to the output of the first backup power module. In some examples, a controller can be coupled to the switch to activate or deactivate the switch based on an output power of each of a plurality of backup power modules. That is, the controller can monitor output power for each backup power module to determine when a particular load coupled to a particular output exceeds a power limitation of a particular backup power module. In some examples, the controller can activate the switch when it is determined that multiple backup power modules are needed to provide the load with adequate power.

The systems described herein can utilize a plurality of backup power modules connected in parallel to provide individual loads with a backup power solution. Previous systems could only utilize the backup power modules for loads within a particular threshold power level. When a load exceeded the particular threshold power level the corresponding backup power module would not be utilized and may be idle for an extended period of time. The systems described herein can include a controller that is coupled to multiple backup power modules to provide power to a load that exceeds the threshold power level of a single backup power module.

The systems described herein can be adaptable to power changes utilized by loads that are coupled to corresponding backup power modules. That is, the power utilized by loads coupled to the plurality of backup power modules can be changed and the controller can ensure that adequate power is continuously provided to loads, even when the power utilized by a load exceeds a threshold power level of a particular backup power module.

Figure 2:
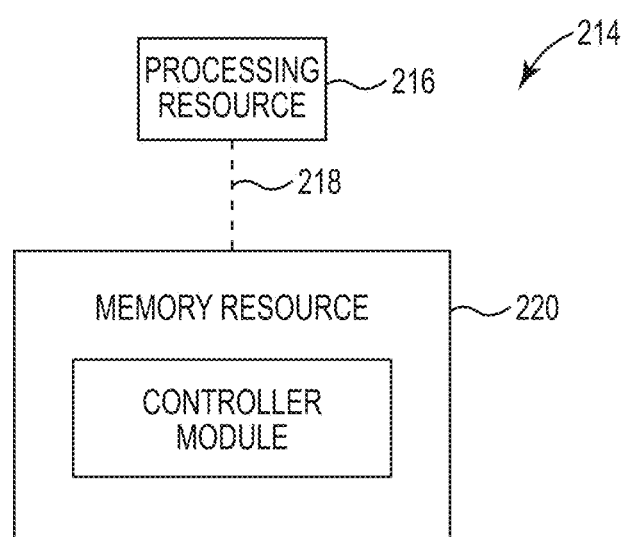
FIG. 2 illustrates a diagram of an example computing device for parallel output of backup power modules consistent with the present disclosure.

FIGS. 1 and 2 illustrate examples of system 100 and computing device 214 consistent with the present disclosure. FIG. 1 illustrates a diagram of an example of a system 100 for parallel output of backup power modules consistent with the present disclosure. The system 100 can include a database 104, a parallel output system 102, and/or a number of engines (e.g., controller engine 106). The parallel output system 102 can be in communication with the database 104 via a communication link, and can include the number of engines (e.g., controller engine 106). The soft-start system 102 can include additional or fewer engines that are illustrated to perform the various functions as will be described in further detail in connection with FIG. 3.

The number of engines (e.g., controller engine 106) can include a combination of hardware and programming, but at least hardware, that is configured to perform functions described herein (e.g., activate the switch when an output power level of one of the first and second backup power modules is greater than a threshold power level, monitor the output power level provided to a first load coupled to the first output of the enclosure and provided to the second load coupled to the second output of the enclosure, activate the switch when one of the first backup power module and the second backup power module are removed from the input of the enclosure and a corresponding output of the enclosure with an energized DC bus, activate the switch when output power of one of the first backup power module and the second backup power module is outside a threshold value, etc.). The programming can include program instructions (e.g., software, firmware, etc.) stored in a memory resource (e.g., computer readable medium, machine readable medium, etc.) as well as hard-wired program (e.g., logic).

The controller engine 106 can include hardware and/or a combination of hardware and programming, but at least hardware, to activate a switch when an output power level of one of a first and a second backup power module is greater than a threshold power level. The output power level can be a power level monitored at the output of a backup power module and/or distributed energy system (DES) that includes an enclosure to encase a plurality of backup power modules. That is, the output power level can be a power level utilized by a load coupled to the output of a particular backup power module. In some examples, the controller engine 106 can monitor the output power level and automatically activate the switch or multiple switches to allow multiple backup power modules to provide power to the load that corresponds to the output power level. In some examples, the controller engine 106 can monitor the output current level and automatically activate the switch or multiple switches to allow multiple backup power modules to provide power to the load that corresponds to the output current level.

The controller engine 106 can include hardware and/or a combination of hardware and programming, but at least hardware, to monitor the output power level provided to a first load coupled to the first output of the enclosure and provided to the second load coupled to the second output of the enclosure. The controller engine 106 can monitor output power level for each backup power module within a particular DES or parallel backup power module system (e.g., system 330 as referenced in FIG. 3, etc.). The monitored output power level can enable the controller engine 106 activate and deactivate a number of switches as described herein. Activating and deactivating the number of switches can provide a single backup power module or a plurality of backup power modules to provide power to a particular load based on the monitored output power level. In some examples, monitoring the output power level can include monitoring the output current of the backup power modules.

The controller engine 106 can include hardware and/or a combination of hardware and programming, but at least hardware, to activate a switch when one of the first backup power module and the second backup power module are removed from the input of the enclosure and a corresponding output of the enclosure with an energized DC bus. In some examples, a first switch can be activated so that a plurality of backup power modules are utilized to provide power to a particular load. In these examples, when one of the plurality backup power modules is removed, the controller engine 106 can be utilized to activate a second switch so that a plurality of backup power modules are utilized to provide power to the particular load.

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., activate the switch when an output power level of one of the first and second backup power modules is greater than a threshold power level, monitor the output power level provided to a first load coupled to the first output of the enclosure and provided to the second load coupled to the second output of the enclosure, activate the switch when one of the first backup power module and the second backup power module are removed from the input of the enclosure and a corresponding output of the enclosure with an energized DC bus, activate the switch when output power of one of the first backup power module and the second backup power module is outside a threshold value, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., controller module 222) can include CRI that when executed by the processing resource 216 can perform functions. The number of modules (e.g., controller module 222) can be sub-modules of other modules. For example, the controller module 222 and an additional module can be sub-modules and/or contained within the same computing device. In another example, the number of modules (e.g., controller module 222) can comprise individual modules at separate and distinct locations (e.g., CRM, etc.).

Each of the number of modules (e.g., controller module 222) can include instructions that when executed by the processing resource 216 can function as a corresponding engine as described herein. For example, the controller module 222 can include instructions that when executed by the processing resource 216 can function as the soft-start controller engine 106.

Figure 3:
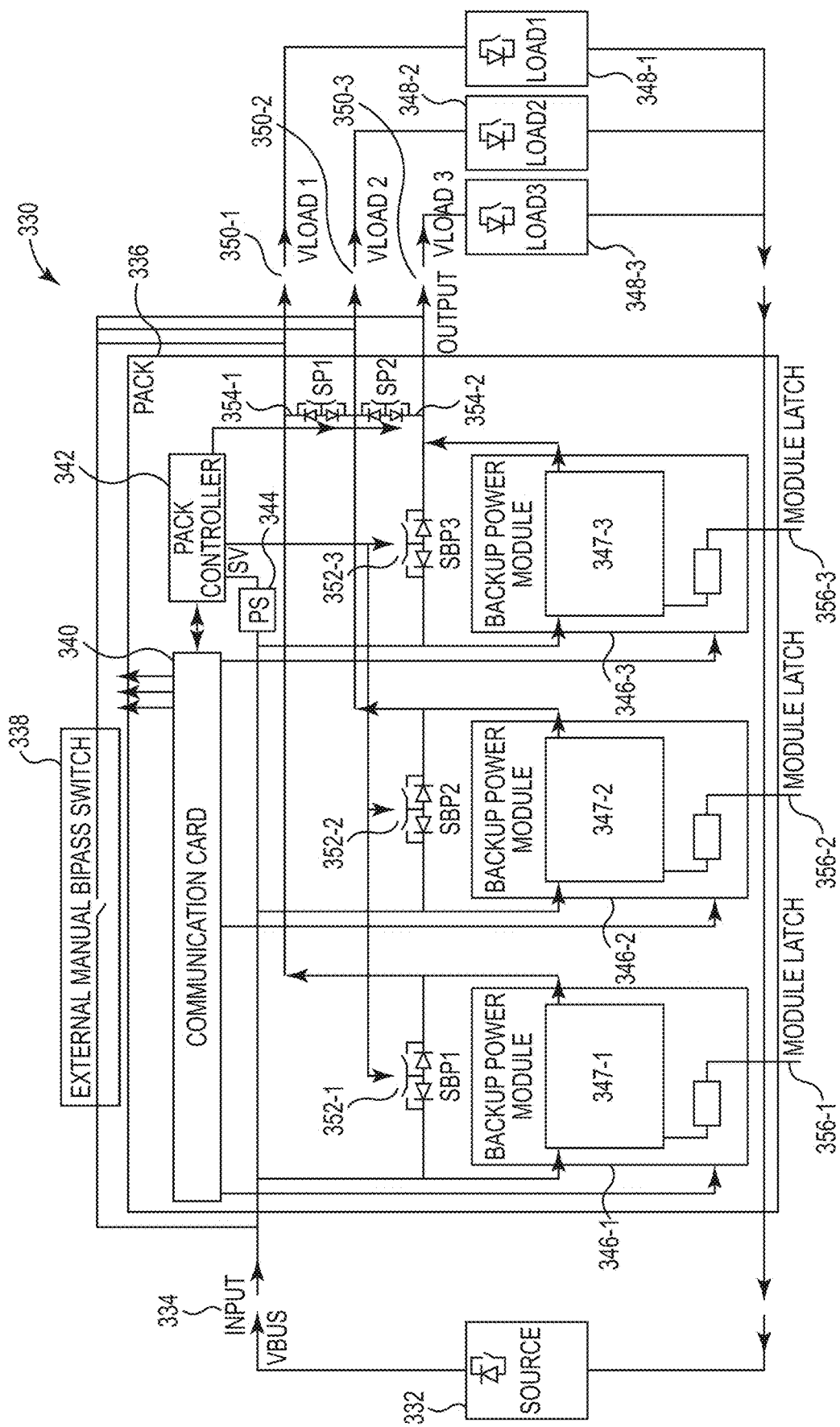
FIG. 3 illustrates an example system for parallel output of backup power modules consistent with the present disclosure.

FIG. 3 illustrates an example system 330 for parallel output of backup power modules consistent with the present disclosure. The system 330 can be utilized to provide power from a main power source 332 during normal operation and provide backup power from a number of backup power modules 346-1, 346-2, 346-3 during a backup operation to a number of loads 348-1, 348-2, 348-3.

In some examples, the system 330 can include a distributed energy system (DES) pack enclosure 336 that encases the number of backup power modules 346-1, 346-2, 346-3, a power supply 344, a pack controller 342, and/or a communication card 340. In some examples, the DES pack enclosure 336 can include an input 334 that is coupled to a main power source 332 and a number of outputs 350-1, 350-2, 350-3 that are each coupled to a corresponding number of loads 348-1, 348-2, 348-3. In some examples, the system 330 can include an external manual bypass switch 338 for bypassing the DES pack enclosure 336 for maintenance or replacement.

In some examples, the power supply 344 can be utilized to direct power received from the main power source 332 to the pack controller 342 and/or a communication card 340. In some examples, the communication card 340 can be utilized to communicate information to a host. In some examples, the pack controller 342 can be utilized to monitor output power and/or output current at the number of outputs 350-1, 350-2, 350-3 of the DES pack enclosure 336. In certain examples, the pack controller 342 can be utilized to monitor output power and/or output current at an output of each of the number of backup power modules 346-1, 346-2, 346-3. In some examples, the pack controller 342 can perform the functions of the controller engine 106 as referenced in FIG. 1 and/or the controller module 222 as referenced in FIG. 2.

In some examples, the number of backup power modules 346-1, 346-2, 346-3 can be coupled in parallel to individually provide power to a corresponding load from the number of loads 348-1, 348-2, 348-3. For examples, backup power module 346-1 can individually provide power to load 348-1 during normal operation as well as provide backup power during backup operations. Thus, in some examples, each of the number of backup power modules 346-1, 346-2, 346-3 can have backup power sources 347-1, 347-2, 347-3 (e.g., batteries, etc.) that can provide power to each of the corresponding number of loads 348-1, 348-2, 348-3. In some examples, the backup power sources 347-1, 347-2, 347-3 can include a plurality of batteries coupled in series to provide high voltage direct current (HVDC) to a number of loads 348-1, 348-2, 348-3 during a backup operation. In some examples, the main power source 332 can supply alternating current (AC) power to the number of loads 348-1, 348-2, 348-3 via the backup power sources 347-1, 347-2, 347-3 during normal operations. Thus, the number of loads 348-1, 348-2, 348-3 can be provided with AC power during normal operation and provided with HVDC during backup operations.

In some examples, the DES pack enclosure 336 can provide a particular total load value (e.g., maximum power level, maximum current, level, etc.). That is, the DES pack enclosure 336 can be limited to a particular total load value. In these examples, the number of loads 348-1, 348-2, 348-3 may not be able to exceed a particular total load value. In some examples each of the number of loads 348-1, 348-2, 348-3 may each utilize an equal share of the total load value. For example, the total load value of the number of loads 348-1, 348-2, 348-3 can be 18 kilowatts (kW). In some examples, each of the number of loads 348-1, 348-2, 348-3 can utilize an equal share of the total load value and utilize 6 kW of power. In this example, each of the number of backup power modules 346-1, 346-2, 346-3 can be utilized to provide 6 kW of power to each of the number of loads 348-1, 348-2, 348-3 respectively.

In some examples, each of the number of loads 348-1, 348-2, 348-3 can utilize an unequal share of the total load value. For example, the total load value of the number of loads 348-1, 348-2, 348-3 can be 16 kW. In this example, load 348-1 can utilize 10 kW, load 348-2 can utilize 0 kW (e.g., deactivated, removed, etc.), and load 348-3 can utilize 6 kW. In this example, each backup power module 346-1, 346-2, 346-3 may only be able to provide 6 kW of power to each corresponding load 348-1, 348-2, 348-3. In this example, the controller 342 can determine that an output current associated with load 348-1 is greater than a threshold of 6 kW. In this example, the controller 342 can activate switch 354-1 to allow backup power module 346-1 and backup power module 346-2 to both provide power to the load 348-1. In this example, the backup power module 346-1 and the backup power module 346-2 can each individually provide 6 kW of power and with the switch 354-1 activated the backup power module 346-1 and the backup power module 346-2 can provide a total of 12 kW to the load 348-1. Thus, adequate power can be provided to the load 348-1 via the backup power module 346-1 and the backup power module 346-2 when the switch 354-1 is activated. In other examples, the controller 342 can activate switch 354-1 and switch 354-2 to provide power to the load 348-1 with the combined resources of the backup power modules 346-1, 346-2, 346-3. For example, the load 348-1 can utilize 15 kW of power and each of the backup power modules 346-1, 346-2, 346-3 can provide 6 kW. In this example, the controller 342 can activate switch 354-1 and switch 354-2 to provide load 348-1 with power up to 18 kW and thus providing adequate power to the load 348-1.

In some examples, the number of switches 354-1, 354-2 can include back to back semiconductors. In some examples, the back to back semiconductors can each act as a switch that can be controlled by the controller 342. In some examples, each of the back to back semiconductors can include reverse polarity semiconductors to prevent reverse polarity between the number of backup power modules 346-1, 346-2, 346-3 of the system 330.

In some examples, the backup power modules 346-1, 346-2, 346-3 can be hot-pluggable backup power modules. As used herein, a hot-pluggable backup power module can include a backup power module that is capable of being coupled and decoupled from an already energized DC bus. For example, each of the backup power modules 346-1, 346-2, 346-3 can be coupled to a corresponding module latch 356-1, 356-2, 356-3. The module latch 356-1, 356-2, 356-3 can be operated by a user to remove a corresponding backup power module 346-1, 346-2, 346-3 even when coupled to an already energized DC bus. For example, backup power module 346-1 can be removed from an already energized DC bus by pressing the module latch 356-1 to a lower position and the backup power module 346-1 can be removed from the DES pack enclosure 336.

In some examples, removing one or more of the backup power modules 346-1, 346-2, 346-3 can create a load from the number of loads 348-1, 348-2, 348-3 to exceed an output current for a number of backup power modules 346-1, 346-2, 346-3. For example, switch 354-1 can be active to enable backup power module 346-1 and backup power module 346-2 to provide power to load 348-2. In this example, if backup power module 346-1 is removed from the DES pack enclosure 336, the controller 342 can determine that the backup power module 346 is not capable of providing adequate power to the load 348-2. In this example, the controller 342 can activate switch 354-2 to enable backup power module 346-2 and backup power module 346-3 to provide power to the load 348-2.

In some examples, each of the backup power modules 346-1, 346-2, 346-3 can include a corresponding bypass switch 352-1, 352-2, 352-3. The number of bypass switches 352-1, 352-2, 352-3 can be utilized to bypass a corresponding backup power module 346-1, 346-2, 346-3 when a backup power module is removed or is non-functional. In some examples, when one of the backup power modules 346-1, 346-2, 346-3 are removed or is non-functional, the corresponding bypass switch 352-1, 352-2, 352-3 can be utilized to bypass the backup power module and continue to provide power, without a backup power module, to a corresponding load of the number of loads 346-1, 346-2, 346-3.

The system 330 can provide for adaptive backup power solutions that utilize a number of parallel backup power modules 346-1, 346-2, 346-3. The system 330 can be utilized to provide power to the number of loads 348-1, 348-2, 348-3 with a corresponding backup power module

346-1, 346-2, 346-3 individually or with a combination of a plurality of backup power modules 346-1, 346-2, 346-3 without having to reconfigure the DES pack enclosure 336. That is, the requirements of the number of loads 348-1, 348-2, 348-3 can be altered and the controller 342 can detect the changes via an output current of each of the backup power modules 346-1, 346-2, 346-3 to determine if a plurality of backup power modules 346-1, 346-2, 346-3 are needed to provide adequate power to one of the number of loads 348-1, 348-2, 348-3.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for parallel output of backup power modules, comprising:
   an enclosure having a single input and a plurality of outputs;
   a plurality of backup power modules contained within the enclosure, each backup power module coupled to the single input of the enclosure and a respective one of the outputs of the enclosure, each of the plurality of backup power modules coupled in parallel with respect to each of the other backup power modules, the plurality of backup power modules including:
      a first backup power module, from the plurality of backup power modules, having a first power module output coupled to a first respective output of the enclosure; and
      a second backup power module, from the plurality of backup power modules, having a second power module output coupled to a second respective output of the enclosure; and
   a switch, wherein upon activation of the switch, completing an electrical coupling between the first power module output and the first respective output of the enclosure to the second power module output and the second output of the enclosure.

2. The system of claim 1, wherein, upon deactivation of the switch, the first backup power module is electrically coupled to a first load coupled to the first power module output and the second backup power module is electrically coupled to a second load coupled to the second power module output, the deactivation of the switch providing electrical isolation between the first power module output and the second power module output.

3. The system of claim 1, wherein the first backup power module and the second backup power module are hot-pluggable backup power modules.

* * * * *